(12) United States Patent
Robertson

(10) Patent No.: US 6,497,486 B1
(45) Date of Patent: Dec. 24, 2002

(54) FAIL OPERATIONAL OPTICAL DESIGN FOR TILED PROJECTION COCKPIT DISPLAYS

(75) Inventor: Richard L. Robertson, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/310,544

(22) Filed: May 12, 1999

(51) Int. Cl.[7] .............................................. G03B 21/26
(52) U.S. Cl. ...................................................... 353/30
(58) Field of Search ............................. 345/31, 32, 33, 345/85; 348/113, 115, 118, 117, 121, 123, 383; 353/30, 82, 85, 94, 98, 99

(56) References Cited

U.S. PATENT DOCUMENTS 5,851,060 A * 12/1998 Uchiyama et al. ............ 353/94
5,902,030 A *  5/1999 Blanchard .................... 353/30

* cited by examiner

Primary Examiner—Safet Metjahic
Assistant Examiner—E P LeRoux
(74) Attorney, Agent, or Firm—Nathan O. Jensen; Kyle Eppele

(57) ABSTRACT

A tiled projection display for use in an aviation environment which has fail operational capabilities without providing for fully redundant spare projectors. The system includes optics for redirecting light from one projector to a central position between an adjacent projector and involves the methods of switching light from one projector to project images for an additional adjacent projector in the event of a projector failure.

20 Claims, 1 Drawing Sheet

FAIL OPERATIONAL OPTICAL DESIGN FOR TILED PROJECTION COCKPIT DISPLAYS

FIELD OF THE INVENTION

The present invention generally relates to panoramic cockpit displays and even more particularly relates to such displays having multiple projectors and a tiled display.

BACKGROUND OF THE INVENTION

In the past, designers of avionics displays have endeavored to provide larger and larger display devices to better provide for enhanced situation awareness for flight crews. The use of projection displays in cockpits is gaining many followers because of their recognized ability to provide panoramic displays.

While these displays have many advantages, they also have significant drawbacks.

Typically, the projectors used in projection display screens are relatively large, heavy and expensive. To provide a Fail Operational system is required in a typical aviation environment. One approach to achieving a Fail Operational projection display configuration that has been proposed is to include fully redundant projectors or include two projectors for each normal projector requirement. One projector is the main unit and the other is a spare. However, if a tiled display system were to have four segments, with each segment using an independent projector, then eight projectors would be needed to provide fully redundancy and Fail Operational capabilities. The extra cost, weight and space required for the extra four projectors can be substantial.

Consequently, there exists a need for improvement in Fail Operational capabilities of tiled projection displays.

SUMMARY OF THE INVENTION

It is an object of the present invention to provide tiled projection displays having Fail Operational capabilities.

It is a feature of the present invention to utilize a shared projector in the event of a projector failure.

It is an advantage of the present invention to reduce the need for fully redundant spare projectors.

It is another feature of the present invention to include an optical switching system for redirecting the images normally emitted by a main projector.

It is another advantage of the present invention to minimize the number of mechanical parts required in an aviation display system.

The present invention is an apparatus and method for providing a projection image in a tiled projection system when a projector fails to operate which is designed to satisfy the aforementioned needs, provide the previously stated objects, include the above-listed features and achieve the already articulated advantages. The present invention is carried out in a "fully redundant projector-less" manner in a sense that the need for fully redundant components in a system having Fail Operational capabilities has been greatly reduced.

Accordingly, the present invention is a tiled projection display system which utilizes an optical switching arrangement where one projector can be used to provide a projected image for an adjacent segment of a tile projection display system.

BRIEF DESCRIPTION OF THE DRAWINGS

The invention may be more fully understood by reading the foregoing description of the preferred embodiments of the invention, in conjunction with the appended drawing wherein:

The FIGURE is a simplified schematic diagram of a tiled projection image system of the present invention, showing light emanating from the projectors during normal use as dashed lines and with the double dotted and dashed lines used to show a light being redirected from one projector to illuminate multiple segments of a tile display system.

DETAILED DESCRIPTION

Figure 1:
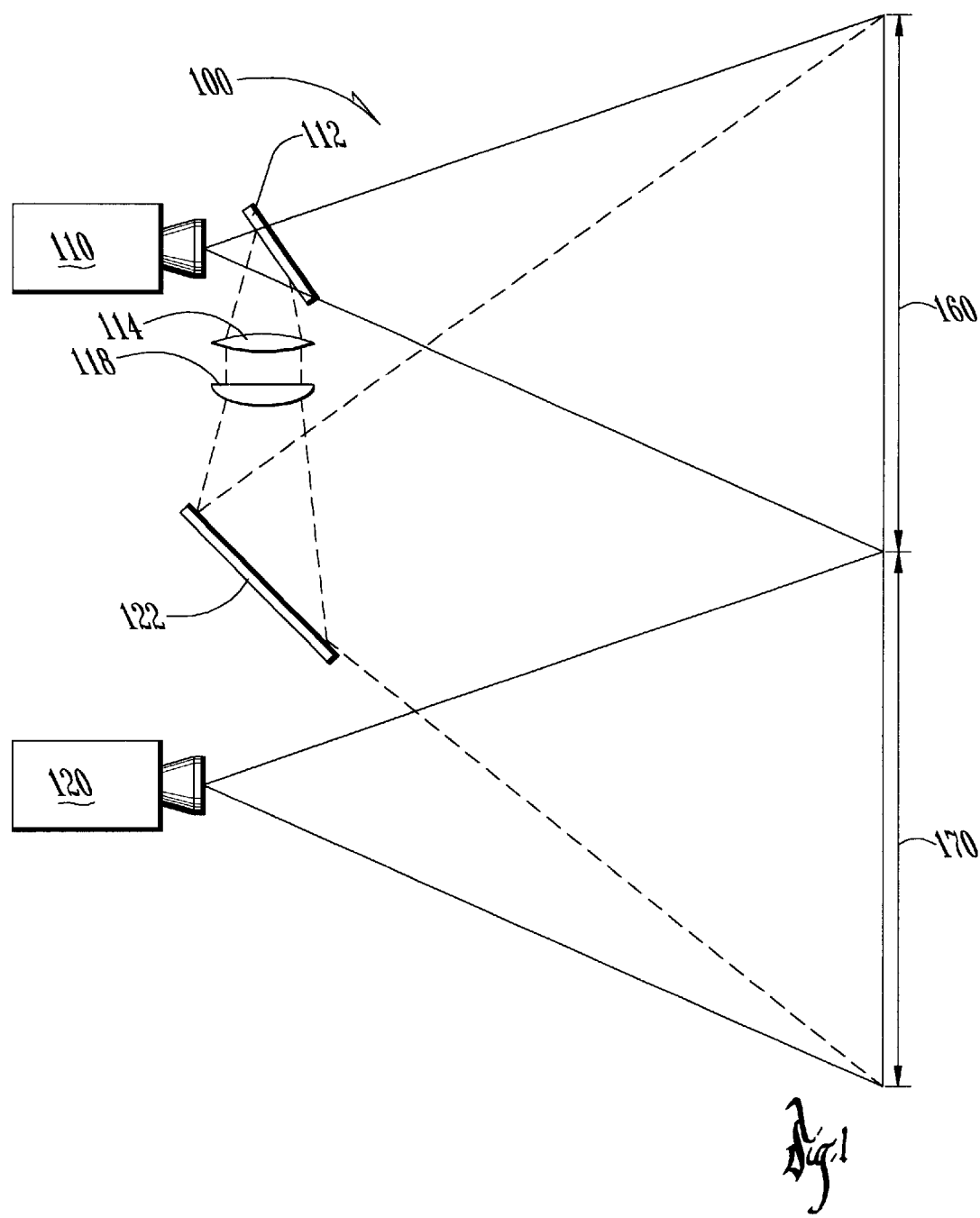

Now referring to the drawing wherein like numerals refer to like matter throughout, there is shown a system of the present invention, generally designated 100, having a first projector 110 and a second projector 120, which may be any type of projector used for projecting portions of a tiled image, such projectors being well known in the art. Projectors 110 and 120 generally emit light to form a portion of an image 160 and 170 respectively. Images 160 and 170 may be projected on to various types of viewing surfaces, which are well known in the art, such as a diffuser disposed in the instrument panel of an aircraft. While the discussion herein is largely focused upon cockpit displays, because it is believed that many of the advantages of the present invention will have substantial utility in an aviation setting, the present invention is not limited to merely cockpit displays. Any environment where one or more of the benefits of the present invention can be enjoyed, is intended to also be included in the present invention. The diffuser or other optical device is chosen to provide a wide viewing angle to facilitate simultaneous cross-cockpit viewing from multiple members of the flight crew. Any viewing surface may be used, and several are well known in the art. Disposed between projectors 110 and 120 and their respective viewing surfaces is a mirror 112, which is a mirror for directing the image emanating from projector 110 to a second failure mode mirror 122, which is used to project the image onto segments 160 and 170. It is generally desirable for the mirror 112 to not preclude illumination of segment 160 during normal operation. Mirror 112 may be physically moved into position from an adjacent location during times of failure of a neighboring projector 120. Alternatively, the mirror 112 may be an opto-electrical device which has the property of a lens during normal operation and when subjected to control signals during failure mode operations, functions as a mirror. Disposed between mirror 112 and failure mode mirror 122 are optical devices 114 and 118 designed to transfer the projected image to a central location between projectors 110 and 120, where it can be better positioned to provide a simultaneous image on segments 160 and 170 with minimal distortion. Optical device 114 may be a positive lens disposed near the mirror 112 for converting the diverging beam reflecting off mirror 112 to a parallel or reduced diverging beam to maintain the overall beam diameter as it traverses the distance between mirror 112 and failure mode mirror 122. Optical device 118 may be a cylindrical lens disposed near the failure mode mirror 122 for converting the parallel beam to a diverging beam prior to reflection by failure mode mirror 122. Only one side of the Fail Operational system is depicted, but it should be understood that a similar or nearly identical arrangement of mirrors and optical element could be associated with projector 120 to address a failure of projector 110. The failure mode mirror 122 may be a shared adjustable (pivoting or otherwise) mirror disposed at the center point between projectors 110 and 120 or each failure mode path may provide its own mirror. In such cases, the paths may be slightly skewed or otherwise configured to accommodate the presence of the components relating to the other projector. All of the components of the present invention, including projectors 110 and 120, mirror 112 and failure mode mirror 122, and optical devices 114 and 118, are individually well known in the art.

In operation, the apparatus and method of the present invention could function as follows:

An image to be projected upon a display surface is determined, the image is projected by at least two projectors, each projecting a separate portion of the tiled image, in the event of a failure of projector 120, the mirror 112 is deployed into operation. The image emanating from projector 110 is changed to include the images which otherwise would have been projected by both projectors 110 and 120. The new combined image is reflected off mirror 112, converted into a parallel beam or reduced diverging beam by optical device 114, traverses the distance to a central region between projectors 110 and 120 and is reconverted into a diverging beam by optical device 118 prior to reflection off failure mode mirror 122 which then illuminates both segments 160 and 170.

In an optional mode, each point on an image would have a minimum of two horizontal pixels, or multiples of two pixels, while in normal operating mode. Upon failure, the graphics engine or other software located in projector 110, and/or 120, or elsewhere, may do a divide by two function, then the horizontal split of the image would retain a normal viewing ratio.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. An apparatus for projecting a tiled image in an aircraft cockpit comprising:
   a first projector for projecting a first portion of the tiled image, in a first projection beam;
   a second projector for projecting a second portion of the tiled image, in a second projection beam;
   a viewing screen having first and second portions for viewing the first portion of the tiled image and the second portion of the tiled image respectively;
   a first beam deflector disposed between said first projector and said first portion of said viewing screen;
   a second beam deflector disposed between said first projector and said second projector which is oriented to reflect light incident thereon in a direction so as to simultaneously illuminate said first and said second portions of said viewing screen.

2. An apparatus of claim 1 further comprising optical elements disposed between said first beam deflector and said second beam deflector for affecting a beam diameter characteristic of light incident upon said second beam deflector.

3. An apparatus of claim 2 wherein said optical elements include a positive lens.

4. An apparatus of claim 3 wherein said optical elements include a cylindrical lens.

5. An apparatus of claim 1 wherein said first beam deflector is a first mirror.

6. An apparatus of claim 5 wherein said first mirror has an electrically controllable reflectivity characteristic.

7. An apparatus of claim 5 wherein said first mirror is movable with respect to light emanating from said first projector.

8. An apparatus of claim 5 wherein said second beam deflector is a second mirror.

9. An apparatus of claim 8 wherein said second mirror is movable with respect to said viewing surface.

10. A tiled projection display system comprising:
    first means for projecting a first image on a first viewing surface;
    second means for projecting a second image on a second viewing surface;
    means for redirecting light, emanating from said first means for projecting a first image, simultaneously onto said first viewing surface and said second viewing surface;
    said means for redirecting light is responsive to signals representative of an operational characteristic of said second means for projecting.

11. An apparatus of claim 10 wherein said means for redirecting light has an adjustable characteristic with respect to said first means for projecting.

12. An apparatus of claim 11 wherein said adjustable characteristic includes means for repositioning said means for redirecting light into a path between said first means and said first viewing surface.

13. An apparatus of claim 10 wherein said first means further includes means, responsive to said signals representative of an operational characteristic of said second means for projecting, for changing light projected therefrom.

14. An apparatus of claim 13 further including means for generating signals responsive to an operational characteristic of said second means for projecting.

15. A method of providing a projection image comprising the steps of:
    providing a first projector for projecting a first image on a first viewing screen;
    providing a second projector for projecting a second image on a second viewing screen disposed adjacent to said first viewing screen;
    monitoring operational characteristics of said second projector and generating signals in response thereto;
    changing light emanating from said first projector to provide a combined image simultaneously containing information from said first image and said second image;
    redirecting said light emanating from said first projector to both said first viewing screen and said second viewing screen.

16. A method of claim 15 wherein said step of redirecting said light includes reflecting said light to a central position between said first projector and said second projector.

17. A method of claim 16 further including reflecting said light toward said first viewing screen and said second viewing screen.

18. A method of claim 17 further including a step of limiting a beam diameter characteristic of light traversing a portion of a space between said first and said second projectors.

19. A method of claim 15 wherein said step of redirecting light is responsive of an operational characteristic of said second projector.

20. A method of claim 19 wherein said step of redirecting light includes electrically addressing a device having an electronically controlled reflectivity characteristic.

* * * * *